Nov. 20, 1962 P. S. RUPERT 3,064,836

LOAD HANDLING DEVICE

Filed Dec. 4, 1959 7 Sheets-Sheet 1

INVENTOR.
PAUL S. RUPERT
BY
Gustave Miller
ATTORNEY

LOAD HANDLING DEVICE

Filed Dec. 4, 1959 7 Sheets-Sheet 2

INVENTOR.
PAUL S. RUPERT
BY
Gustave Miller
ATTORNEY

INVENTOR.
PAUL S. RUPERT
BY Gustave Miller
ATTORNEY

Nov. 20, 1962 P. S. RUPERT 3,064,836

LOAD HANDLING DEVICE

Filed Dec. 4, 1959 7 Sheets-Sheet 4

INVENTOR.
PAUL S. RUPERT
BY
Gustave Miller
ATTORNEY

INVENTOR
PAUL S. RUPERT
BY Gustave Miller
ATTORNEY

Nov. 20, 1962 P. S. RUPERT 3,064,836

LOAD HANDLING DEVICE

Filed Dec. 4, 1959 7 Sheets-Sheet 6

INVENTOR
PAUL S. RUPERT

BY Gustave Miller
ATTORNEY

Nov. 20, 1962 P. S. RUPERT 3,064,836

LOAD HANDLING DEVICE

Filed Dec. 4, 1959 7 Sheets-Sheet 7

INVENTOR
PAUL S. RUPERT

BY Gustave Miller
ATTORNEY

United States Patent Office 3,064,836
Patented Nov. 20, 1962

3,064,836
LOAD HANDLING DEVICE

Paul S. Rupert, Palo Alto, Calif., assignor to Empresa Nacional de Inversiones, S.A., Panama City, Panama, a corporation of Panama Filed Dec. 4, 1959, Ser. No. 857,285
1 Claim. (Cl. 214—83.24)

This invention relates to means for loading and unloading vehicles or the like, and it more particularly relates to power-operated means of the aforesaid type.

Heretofore, it has been the general practice to load and unload trucks or the like either by hand, by the use of dollies or by the use of lift trucks. This manner of loading or unloading involves a considerable expenditure of time and effort and also keeps the vehicle inoperative for its main function of transporting the load while the loading and unloading takes place. Consequently, the expense as well as the time wasted in transporting freight or the like from one place to another is unduly great.

The aforesaid problem concerns not only trucks but also trailers, railroad freight cars, barges, station wagons and airplanes, to name only a few of the vehicles concerned.

It is one object of the present invention to overcome the above as well as other disadvantages inherent in prior load handling systems by providing a load handling system which is adapted to effect a loading and unloading operation within a relatively short time and yet with great ease and effectiveness.

Another object of the present invention is to provide a load handling means of the aforesaid type which is relatively simple inconstruction and operation and which requires a minimum of skill for its operation.

Another object of the present invention is to provide a load handling means of the aforesaid type which is adapted for use with any size or type of carrier, whether the carrier be movable on land, sea or air.

Other objects of the present invention are to provide an improved load handling means, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
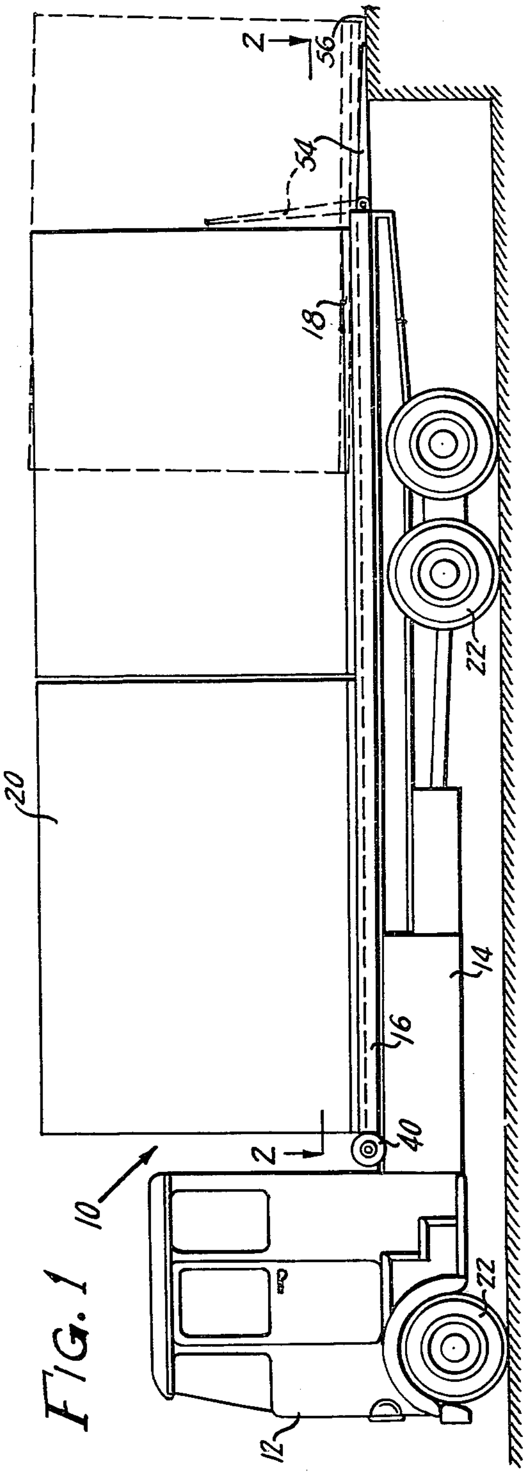
FIG. 1 is a side elevational view of a truck equipped with a load handling means embodying the present invention, the truck being shown in the loaded position.
Figure 2:
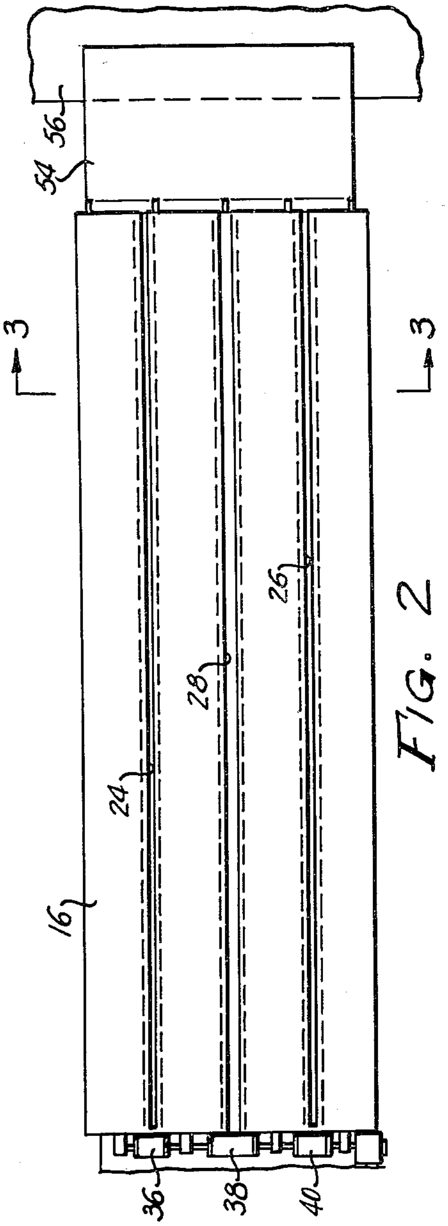
FIG. 2 is a top plan view of the load supporting platform taken on line 2—2 of FIG. 1, and with the load omitted.

Referring in greater detail to the drawings wherein similar reference characters refer to similar parts, there is shown in FIG. 1 a truck, generally designated 10, comprising a cab 12 mounted on a chassis 14. On the chassis 14 is provided a load supporting platform 16 which supports a pallet 18 on which is provided a load 20. The chassis 14 is supported on wheels 22.

Figure 3:
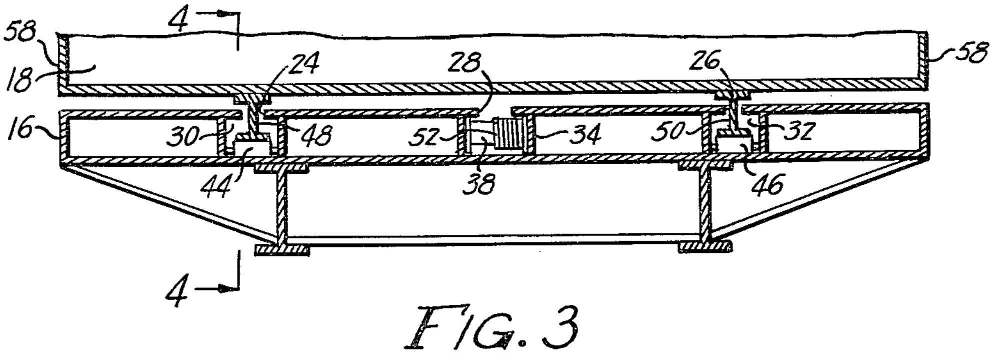
FIG. 3 is a sectional view taken on line 3—3 of FIG. 2.
Figure 4:
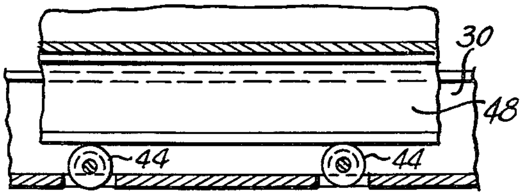
FIG. 4 is a fragmentary sectional view taken on line 4—4 of FIG. 3.

The platform 16 is a generally rectangular, flat bed illustrated as being of hollow construction (note FIG. 3) although this is optional. The top surface of the platform 16 is provided with three parallel, laterally-spaced longitudinal slots comprising two side slots 24 and 26 and a central slot 28. Underlying the slot 24 is a channel 30, underlying the slot 26 is a channel 32 and underlying the slot 28 is a channel 34.

Mounted on the truck chassis 14 between the cab 12 and the forward edge of the platform 16 are three winches indicated at 36, 38 and 40, respectively. The winch 38 is the main power winch while the winches 36 and 40 are auxiliary winches which may be used when extra power is desired. For this purpose, the auxiliary winches are preferably provided with standard type clutch means (not shown) for connecting or disconnecting them from the source of power.

The source of power would ordinarily depend on the size and nature of the vehicle. The winches can either be operated electrically off the generator of the truck, by means of a hydraulic or pneumatic system or by mechanical operation using the takeoff from the differential.

At the bottom of each of the channels 30 and 32 there are provided a series of rollers, indicated at 44 and 46, respectively. These rollers 44 and 46 movably support respective rails in the form of I-beams 48 and 50 depending from the bottom of the pallet 18, these I-beams 48 and 50 extending through the corresponding slots 24 and 26.

The winch comprises a drum upon which is wound a cable 52. This cable 52 extends through the channel 34 underlying the slot 28 and is provided with hook means for attachment to the pallet 18.

At the rear of the platform 16 is provided a hinged ramp 54 which, when in the horizontal position, serves as a loading ramp between the truck and the loading dock 56, while, when it is in the vertical position, it serves as a rear gate for the load.

The pallet 18, as described above, is provided with the aforesaid I-beams 48 and 50 on its underside, these I-beams being slidable in the channels 30 and 32 over the rollers 44 and 46. On its upper face, the pallet 18 is preferably provided with upstanding side walls 58 to retain the load against lateral movement; however, these side walls may be omitted if desired.

In the loading operation, the truck backs up to the loading dock and the ramp 54 is lowered into position (as in FIG. 1). Then a pallet 18, previously loaded, is connected to the hook on the cable 52 and the winch 38 is actuated to move the pallet and its load over the ramp and onto the platform 16. The pallet is moved onto the platform 16 in such manner that its I-beams 48 and 50 enter their respective channels 30 and 32 and move over the rollers 44 and 46 until the pallet has been brought fully into position on the platform 16. The ramp 54 is then moved up into its gate position and the truck is ready to move.

When the truck reaches its unloading station, the ramp 54 is lowered, after the truck has been backed into position adjacent the unloading dock. The winch 38 is then actuated in the reverse direction after the cable 52 has been attached to the proper position on the pallet 18 to unload the entire pallet and its load onto the unloading dock. The unloading may also be effected by running the cable 52 around a pulley adjacent the rear of the platform 16 and then attaching the cable to the rear of the pallet 18. The winch 38 can then be operated in the same direction as in loading. However, in this case, the cable will act to pull the pallet onto the downwardly inclined ramp 54 from where it slides onto the unloading dock.

Instead of the winch and cable system described above, a chain and sprocket assembly may be used whereby the endless chain is provided with hook means to engage a corresponding portion of the pallet and the sprockets may be rotated in opposite directions to load or unload the pallet. It is also within the scope of this invention to substitute a screw shaft for the winch and cable arrangement. Such screw shaft would extend through channel 34 and be adapted to be engaged by a corresponding threaded nut portion on the pallet whereby the pallet could be moved in either direction according to the reversible direction of rotation of the shaft. The threaded nut would be rotatable relative to the pallet to permit screw actautíon thereof.

Figure 5:
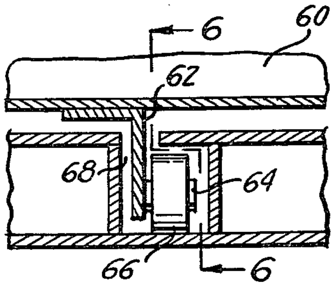
FIG. 5 is a fragmentary sectional view of a modified form of pallet support means.
Figure 6:
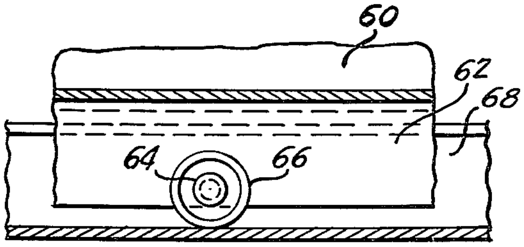
FIG. 6 is a sectional view taken on line 6—6 of FIG. 5.

In FIGS. 5 and 6 there is shown a modified pallet support means whereby the pallet 60 is provided with angle bar supports 62 depending therefrom on opposite sides. The supports 62 are provided shafts 64 on which are provided rollers 66 movable on the floor of corresponding channel 68. The channels 68 are substituted for the channels 30 and 32, there being two such channels 68.

By means of the construction shown in FIGS. 5 and 6, the pallet 60 is rotatably supported not only while moving over the load supporting platform on the truck but also while moving over the loading and unloading docks.

Figure 7:
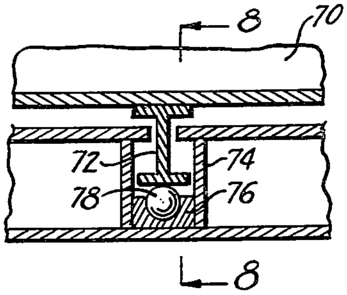
FIG. 7 is a view similar to FIG. 5 but showing a third form of pallet support means.
Figure 8:
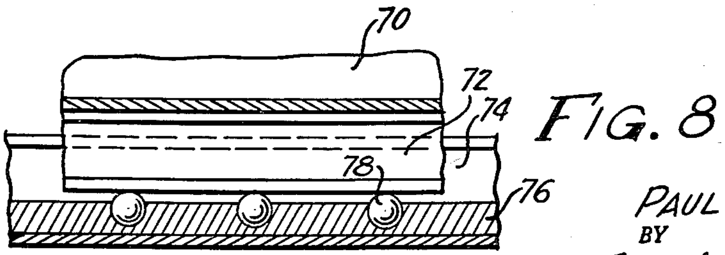
FIG. 8 is a sectional view taken on line 8—8 of FIG. 7.

In FIGS. 7 and 8, the pallet 70 is provided with I-beams 72 similar to I-beams 48 and 50. However, in the channels 74, corresponding to channels 30 and 32, an insert 76 is provided. This insert 76 is formed with bearing portions in each of which is rotatably positioned a ball 78. These balls 78 act as universal supports for the pallet 70.

Figures 9, 10:
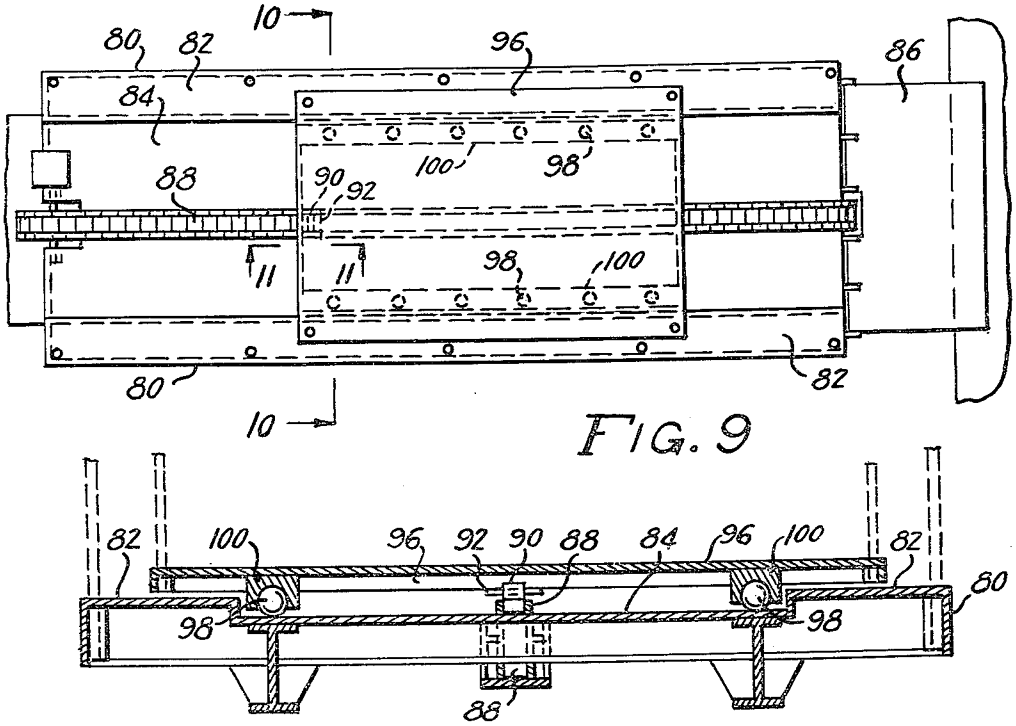
FIG. 9 is a top plan view of an alternate embodiment of the present invention.
FIG. 10 is a sectional view taken on line 10—10 of FIG. 9.
Figure 11:
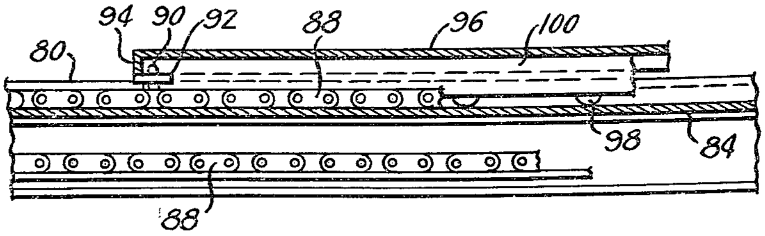
FIG. 11 is a fragmentary sectional view taken on line 11—11 of FIG. 9.

In FIGS. 9, 10 and 11 there is shown an alternative form of the invention wherein the load supporting platform 80 is provided with oppositely-positioned raised longitudinal edge portions 82 between which is provided a recessed portion 84. At its rear edge, the platform 80 is provided with a hinged ramp 86 similar to ramp 54.

Extending longitudinally along the central portion of the platform 80 is a chain 88. This chain 88 extends around a sprocket at either end of the platform 80, one of these sprockets being driven by the truck motor through the take off from the differential or by other desired means such as described with relation to winch 38.

The chain 88 is provided with a lug or pin 90 adapted to engage a finger 92 on the forward depending edge flange 94 of a rectangular pallet 96. By means of this engagement of pin 90 either with the forward edge 94 or the similar rear edge 96 of the pallet, the pallet is movable in either direction by means of the chain 88.

In its movement over the platform 80, the pallet 96 is supported by means of balls 98 rotatably positioned in corresponding recesses in oppositely-arranged, longitudinally-extending rails or bars 100 depending from the bottom of the pallet 96. The rails 100 are each positioned inwardly of the corresponding edges of the pallet and are arranged to just fit within the central recessed portion 84. In this manner, the pallet is easily slidable along the platform 80 while the shoulders formed by the upraised sides 82 act as guides to prevent lateral displacement of the pallet during its movement.

The type of construction illustrated in FIGS. 9, 10 and 11 is not only simple and highly efficient but also eliminates the precise measurements and alignments needed where slots and I-beams are used.

Figures 12, 13, 14:
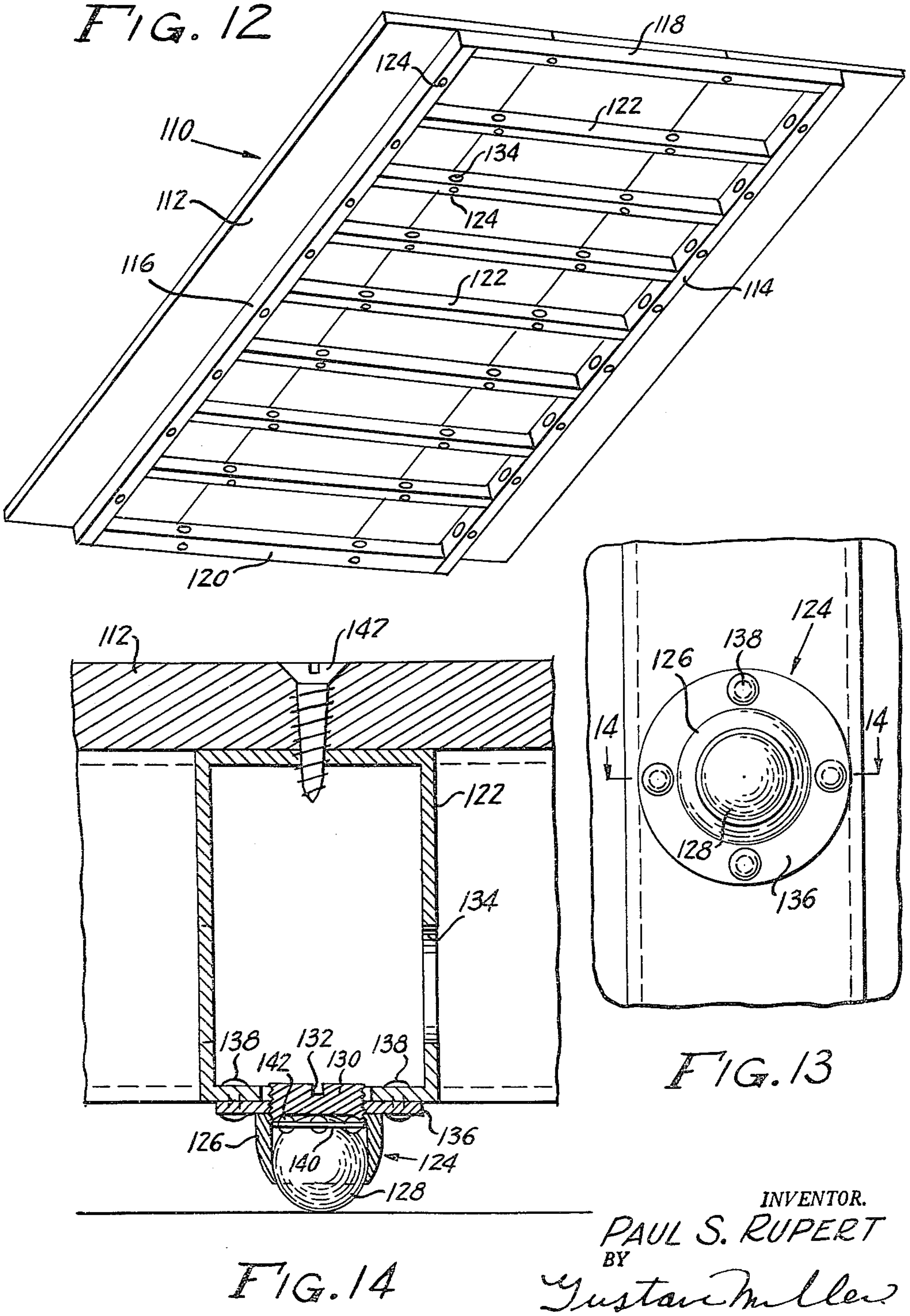
FIG. 12 is a bottom perspective view of one type of pallet which may be used in accordance with the present invention.
FIG. 13 is an enlarged, detailed bottom elevational view of one of the ball type support units of the pallet shown in FIG. 12.
FIG. 14 is a sectional view taken on line 14—14 of FIG. 13.
Figure 15:
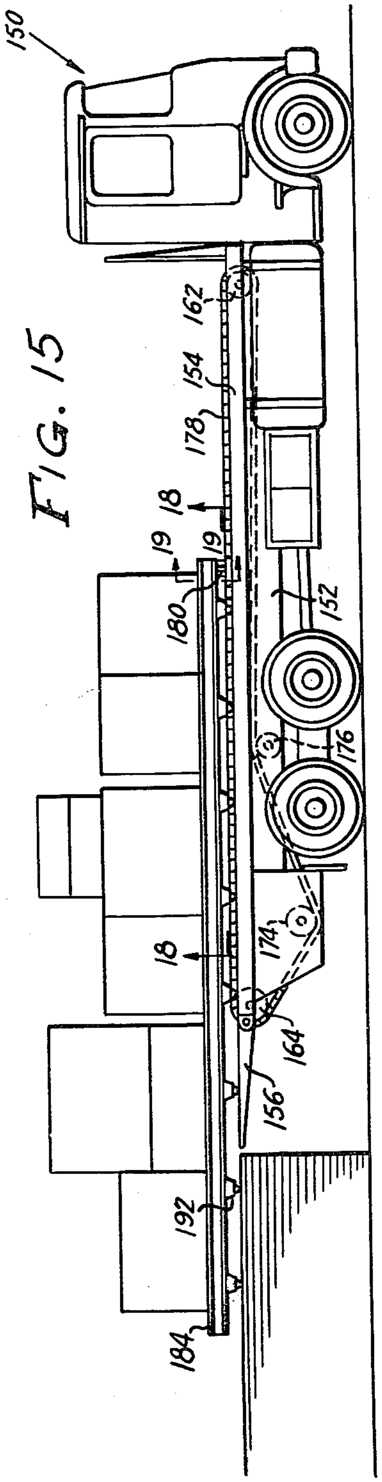
FIG. 15 is a side elevational view of a truck equipped with a load handling means forming another alternative embodiment of the present invention.
Figure 16:
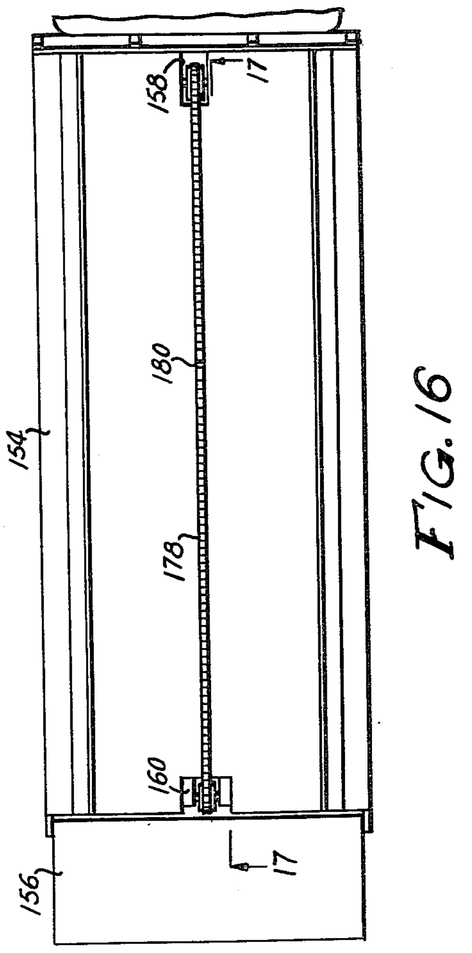
FIG. 16 is a top plan view of the load handling means shown in FIG. 15.
Figure 17:
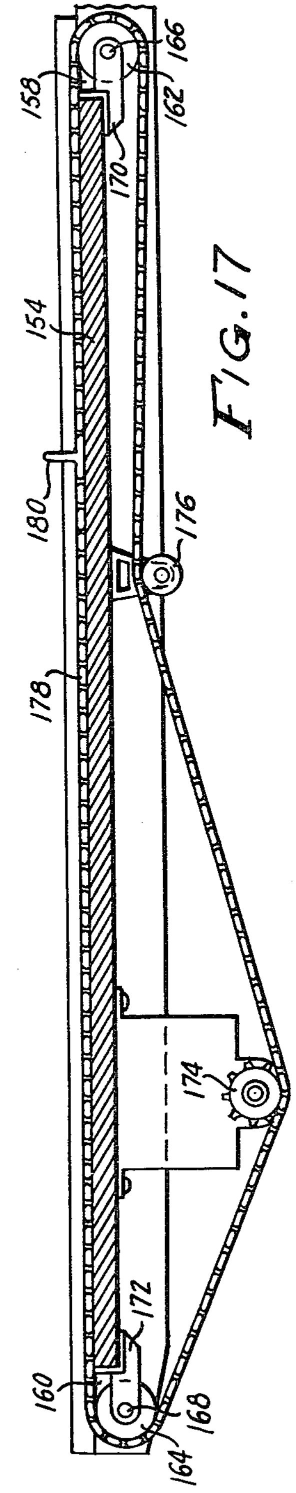
FIG. 17 is a sectional view taken on line 17—17 of FIG. 16.
Figure 18:
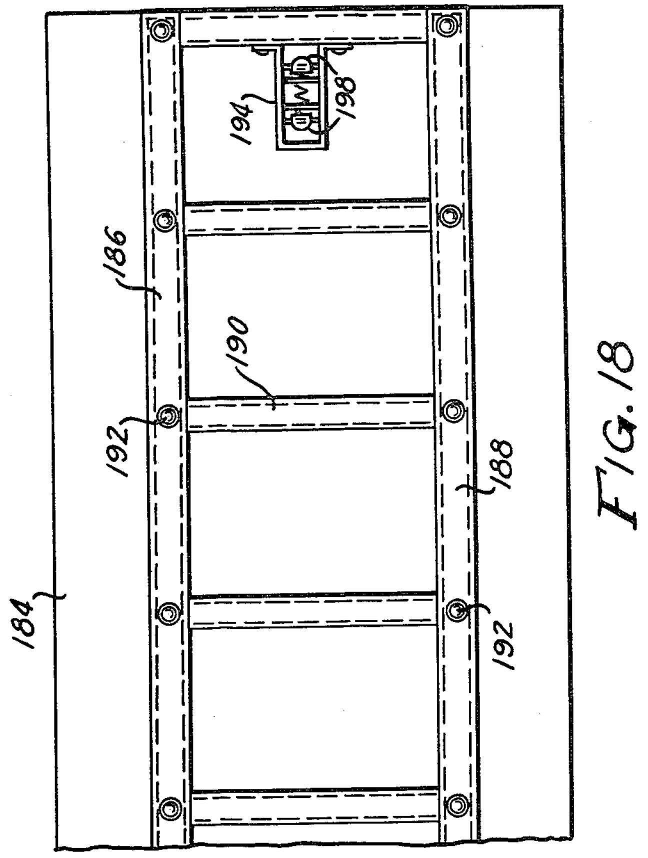
FIG. 18 is a fragmentary, bottom elevational view taken on line 18—18 of FIG. 15.
Figure 19:
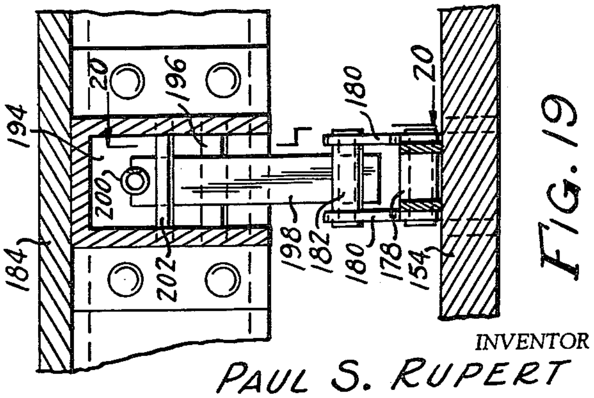
FIG. 19 is a fragmentary sectional view taken on line 19—19 of FIG. 15.
Figure 20:
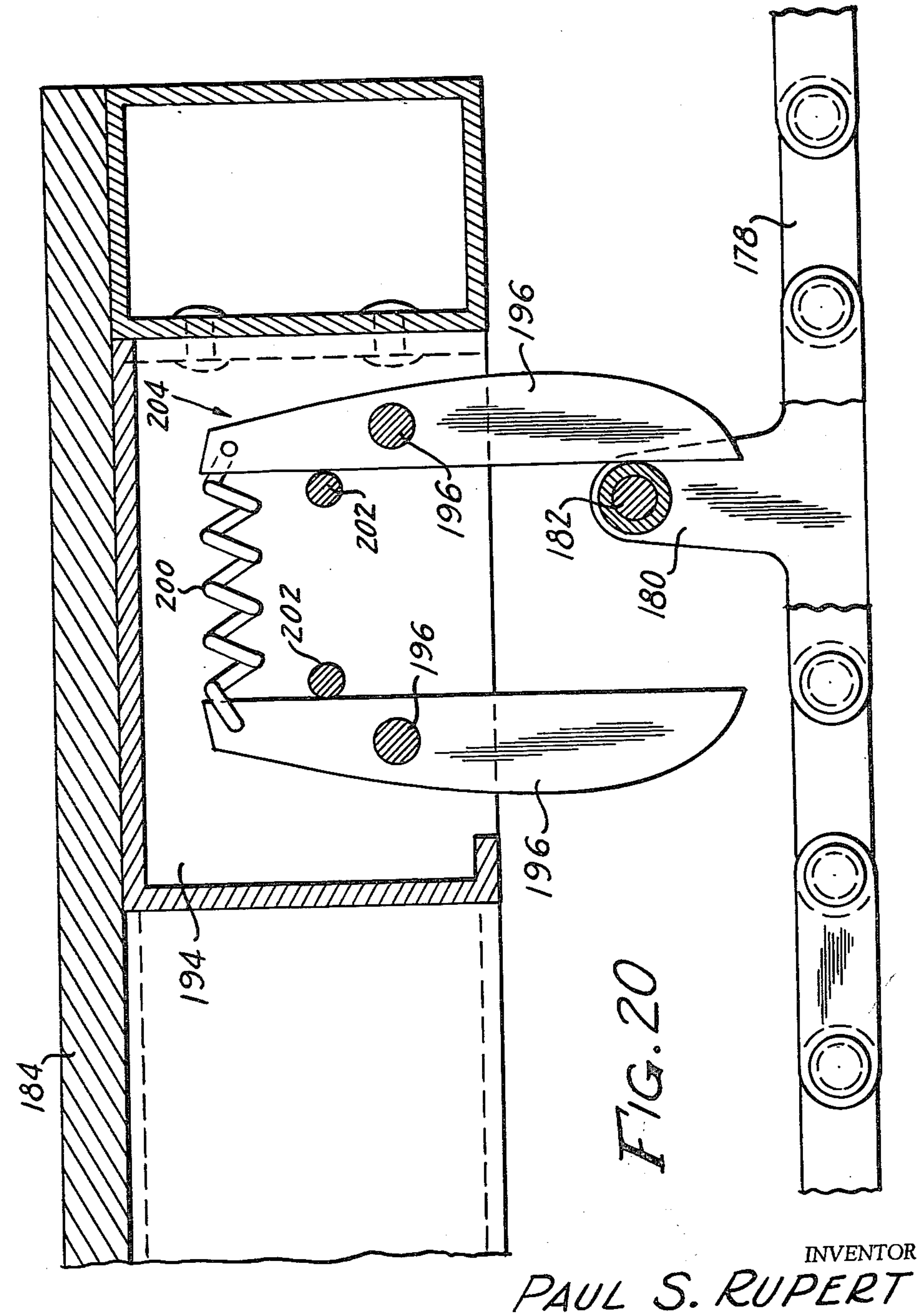
FIG. 20 is a fragmentary view, partly in section and partly in elevation, taken on line 20—20 of FIG. 19.

In FIG. 12 there is shown one preferred type of pallet wherein the pallet 110 comprises a flat, rectangular top 112 having on its underside a pair of spaced, parallel, longitudinal rails 114 and 116 joined by end rails 118 and 120. Extending between rails 114 and 116 are a series of laterally-spaced, transverse rails 122 parallel with each other and with the end rails 118 and 120. The rails 112 and 114 are spaced inwardly of their respective pallet edges so that an overhang or flange is provided on each side similar to those provided at each side of pallet 96 in FIGS. 9, 10 and 11.

At spaced intervals in the bottoms of the rails 112, 114, 118, 120 and 122 there are provided support ball assemblies, generally designated 124. Each of these assemblies 124 comprises a ball-retaining cup 126 fitted in an aperture in the bottom of the corresponding rail, each said cup having a lower opening just large enough to permit a minor portion of a ball 128 to project therefrom. The cup 126 is internally threaded at its upper end to threadedly engage with an externally threaded disc cap 130. The cap 130 has a screw-driver slot 132 therein which may be reached through an aperture 134 in the side of the corresponding rail which is hollow. Between the upper end of the cup 126 and the bottom of the rail is provided an attaching ring 136 internally threaded to be engaged with the external threads on the cap 130. The ring 136 is provided with spaced holes to receive rivets 138 or the like for attaching the ring to the bottom of the rail. Within the cup, adjacent the upper edge thereof, is provided a ring bearing 140 having bearing balls 142 to aid the universal movement of the ball 128.

The rail 122 (shown in FIG. 14) as well as the other rails are connected to the underside of the pallet top 112 by any desirable means such as the screws 142 shown in FIG. 14.

Although the above-described ball assembly 124 has been illustrated in conjunction with pallet 110, it may also be used in conjunction with the various other pallets shown.

In FIGS. 15 to 20 is shown a highly efficient embodiment of the present invention wherein a truck 150 is provided with a chassis 152 having a load support platform 154 at the rear end of which is a hinged ramp 156.

At each end of the platform 154 is a slot, as at 158 and 160. In each of said slots is provided a sprocket, as at 162 and 164. These sprockets are mounted on respective shafts 166 and 168 held on corresponding brackets 170 and 172 fixed to the underside of the platform 154. The sprocket 162 is driven by means of appropriate gearing or the like operatively connected to the truck motor or to such other power means as may be desired.

Extending around the sprockets 162 and 164 as well as around idler sprockets 174 and 176 is a chain 178. This chain 178 is provided with upstanding ears 180 between which is supported a pin 182.

Movable over the platform 154 is a pallet 184 having on its underside a pair of laterally-spaced, longitudinally extending rails 186 and 188 between which extend transverse rails 190. The rails 186 and 188 are provided with bearing ball assemblies 192 of the type shown in FIG. 14.

At the front end of the pallet 184, on the underside thereof, is provided a recess 194 having a pair of spaced pivot pins 196 on each of which is pivoted a blade 198. The blades 198 are connected at their upper ends by a tension spring 200 and each blade bears against a stop pin 202. The entire assembly 196–202 forms an automatic catch, generally designated 204.

The above-described catch 204 permits the chain 178 to continue its movement after the pallet 184 has reached its full travel. The spring loaded blades provide an effective connection between the pallet and chain in either direction of chain travel but will pivot out of the way when the chain has reached the limit of its movement in either horizontal direction.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In a load handling and transporting vehicle the combination comprising: a fixed load supporting platform which is a substantially permanent part of the vehicle; at least two spaced-apart longitudinal guides fixedly disposed in said fixed platform; a movable load-supporting platform; a mutliplicity of bearing balls mounted on the underside of said movable load supporting platform in at least two spaced longitudinal rows; and power means on said vehicle for stabilizing and driving said movable platform in a longitudinal direction to remove said platform completely from the vehicle; said rows of bearing balls being so spaced apart to engage with and to be guided by said guides for movement of said movable platform from said vehicle; said bearing balls normally extending downwardly beyond any other portion of said movable platform when said movable platform is to be moved and being present in sufficient number to permit easy movement of said movable platform in said longitudinal direction in the said guides within said vehicle and easy manually propelled movement in any direction when said movable platform is on a level surface outside of said vehicle, wherein said power and stabilizing means includes an endless chain means, said means including an upstanding pin mounted on said chain and projecting thereabove, said load supporting platform including a recess on the underside thereof and a self-releasable catch in said recess, said catch comprising a pair of opposed blades, each blade having an inner straight edge and an outer curved edge, said straight edges facing each other, said blades each being pivoted intermediate their length and being connected to each other at corresponding ends by a tension spring, and stop means engaging the straight inner edge of each blade, said straight inner edges also being selectively engageable with said catch pin.

References Cited in the file of this patent

UNITED STATES PATENTS

| | | |
|---|---|---|
| 1,287,759 | Russell | Dec. 17, 1918 |
| 2,534,057 | Pride | Dec. 12, 1950 |
| 2,678,139 | Gildersleeve | May 16, 1954 |
| 2,717,699 | Spindler et al. | Sept. 13, 1955 |
| 2,819,810 | Dewitt | Jan. 14, 1958 |
| 2,949,992 | Weinberg | Aug. 23, 1960 |